United States Patent
Charugundla

(10) Patent No.: US 9,208,784 B2
(45) Date of Patent: Dec. 8, 2015

(54) METHODODOLGY FOR LIVE TEXT BROADCASTING

(71) Applicant: Kent S. Charugundla, New York, NY (US)

(72) Inventor: Kent S. Charugundla, New York, NY (US)

(73) Assignee: C21 Patents, LLC, New York, NY (US)

( * ) Notice: Subject to any disclaimer, the term of this patent is extended or adjusted under 35 U.S.C. 154(b) by 191 days.

(21) Appl. No.: 13/736,383

(22) Filed: Jan. 8, 2013

(65) Prior Publication Data

US 2014/0195229 A1    Jul. 10, 2014

(51) Int. Cl.
*G10L 15/26* (2006.01)

(52) U.S. Cl.
CPC .................................... *G10L 15/265* (2013.01)

(58) Field of Classification Search
CPC .................................................... G10L 15/265
USPC ........................................................ 704/235
See application file for complete search history.

(56) References Cited

U.S. PATENT DOCUMENTS

| | | | |
|---|---|---|---|
| 6,504,910 B1 | 1/2003 | Engelke et al. | |
| 6,735,286 B1 | 5/2004 | Hansen et al. | |
| 6,775,360 B2 | 8/2004 | Davidson et al. | |
| 6,950,501 B1 * | 9/2005 | Chaturvedi et al. | 379/52 |
| 7,027,986 B2 | 4/2006 | Caldwell et al. | |
| 7,142,642 B2 | 11/2006 | McClelland et al. | |
| 7,200,208 B2 | 4/2007 | Smith, Jr. et al. | |
| 7,236,574 B2 | 6/2007 | Hademan et al. | |
| 7,315,612 B2 | 1/2008 | McClelland | |
| 7,319,740 B2 | 1/2008 | Engelke et al. | |
| 7,415,537 B1 * | 8/2008 | Maes | 709/246 |
| 7,941,534 B2 * | 5/2011 | de la Huerga | 709/225 |
| 8,019,815 B2 * | 9/2011 | Keener et al. | 709/204 |
| 8,428,227 B2 * | 4/2013 | Angel et al. | 379/68 |
| 8,542,804 B2 * | 9/2013 | Katis et al. | 379/88.13 |
| 8,559,319 B2 * | 10/2013 | Katis et al. | 370/249 |
| 8,566,887 B2 * | 10/2013 | Hasek et al. | 725/94 |
| 8,806,320 B1 * | 8/2014 | Abdo | 715/203 |
| 8,825,489 B2 * | 9/2014 | Scoggins et al. | 704/270 |
| 2001/0005411 A1 | 6/2001 | Engelke et al. | |
| 2006/0106602 A1 | 5/2006 | Caldwell et al. | |
| 2006/0285652 A1 | 12/2006 | McClelland et al. | |
| 2007/0036282 A1 | 2/2007 | Engelke et al. | |
| 2008/0152093 A1 | 6/2008 | Engleke et al. | |
| 2008/0187108 A1 | 8/2008 | Engelke et al. | |
| 2009/0190742 A1 | 7/2009 | Freeman et al. | |
| 2009/0262906 A1 | 10/2009 | Goldman et al. | |

* cited by examiner

*Primary Examiner* — Susan McFadden
(74) *Attorney, Agent, or Firm* — Paul J. Sutton; Barry G. Magidoff

(57) ABSTRACT

A Transcription Engine is able to broadcast over the Internet streaming text associated with a broadcast to registered and authenticated end users who may be hearing impaired or may have difficulty understanding the language used in the broadcast. The end users' understanding of the information being broadcast is improved because of the availability of the associated text. The Transcription Engine comprises an authentication server, a database server and a Transcription server. End users are first registered automatically at a website associated with the Transcription Engine. Registered end users can then login and are authenticated automatically by the Transcription Engine prior to being given access to a live or recorded broadcast of associated text. The end users thus obtain access to the associated text broadcast via the Internet after having been authenticated by the Transcription Engine.

20 Claims, 5 Drawing Sheets

METHODODOLGY FOR LIVE TEXT BROADCASTING

FIELD OF THE INVENTION

The present invention generally relates to the field of telecommunications. In particular, the present invention relates to a system and method for assisting and improving communications for persons who are hearing impaired and/or persons facing language barriers.

BACKGROUND OF THE INVENTION

In today's technological environment, information is readily available from many different types of communication devices now commonly used by virtually everyone in our society. Smart phones, tablets, portable laptops and other such devices are ubiquitous and have become part of our everyday landscape. Surprisingly the manner in which much of the information conveyed over communication networks such as the Internet with the use of these communication devices is lacking in that the delivery of the information typically does not take into account the physical capabilities or disabilities of users of such information.

For example, many users are hearing impaired or have difficulty understanding voice and/or visual communications due to physical impairments. Moreover, there may be a language issue whereby the language used to convey the information may not be a user's natural language thus making user understanding of the conveyed information an important issue in terms of the effectiveness of the communication. Further, increasingly our society is becoming more reliant on our communication infrastructure to convey important and crucial information to the public at large. Consequently, those in our society who cannot readily understand the conveyed information because of the manner of delivery are inherently at a disadvantage.

Even though our communication infrastructure, which includes communication devices and universally accessible communication networks, has significantly facilitated the dissemination of information, these disadvantaged members of our society are increasingly becoming marginalized with respect to their participation in our communication systems. In particular, members of the general public who have difficulty understanding voice communications often face formidable obstacles in readily understanding the mass broadcast of information received through readily available communication devices. There are many scenarios of such cases. For example hearing impaired individuals or those who have difficulty understanding broadcast information due to lack of facility with the particular language used in broadcasting information to the public include students at Universities attending lectures, members of a church attending church services, and members of professional organizations attending conventions and general meetings of such organizations.

Often many of these broadcasts are also available online over the Internet as live or recorded broadcasts. Such broadcasts are often viewed as a useful technological improvement in the dissemination of information to select groups of the public at large. However, inasmuch as these live or recorded broadcasts are useful to individuals who cannot attend the actual broadcast or cannot listen to the actual broadcasts, persons with hearing impairments or persons with difficulty understanding the language of these broadcasts cannot avail themselves of this technological improvement or other improvements in the mass dissemination of voice communications to select groups. The design of new devices or adjustments to the operation of already existing devices may be an approach to addressing these obstacles faced by many members of our society. However, such redesigns may be impractical and more importantly may not be prudent from a purely economic standpoint.

SUMMARY

The present invention provides a Transcription Engine that improves communications between a speaker broadcasting information in the form of voice communications and listeners of the actual or live broadcast or a recorded version of the broadcast. The device, system and method of the present invention comprises at least one server capable of transcribing, in real time, received voice communications into associated text and broadcasting the associated text to clients and end users of the Transcription Engine. The broadcast of the associated text helps to improve the understanding of the voice communications by those end users with hearing impairments or the end users having difficulty understanding the language in which the broadcast is done. The Transcription Engine broadcasts the associated text over a particular communication network in accordance with the protocols of the communication network. The Transcription Engine of the present invention registers and authenticates automatically clients desiring usage of the Transcription Engine to broadcast information to select groups and to end users who are members of the select groups.

In one embodiment of the system, device and method of the present invention, the communication network to which the Transcription Engine is coupled is the Internet and clients and end users are able to access a website associated with the Transcription Engine to login and/or register. Those clients and end users who have registered and have been authenticated by the Transcription Engine will be able to broadcast or transmit a recorded broadcast and/or view a live or recorded broadcasts of the associated text information in accordance with their agreement with the owner/controlling entity of the Transcription Engine.

Further features and advantages of the present invention, as well as the structure and operation of various aspects of the present invention, are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements.

DETAILED DESCRIPTION

Figure 1:
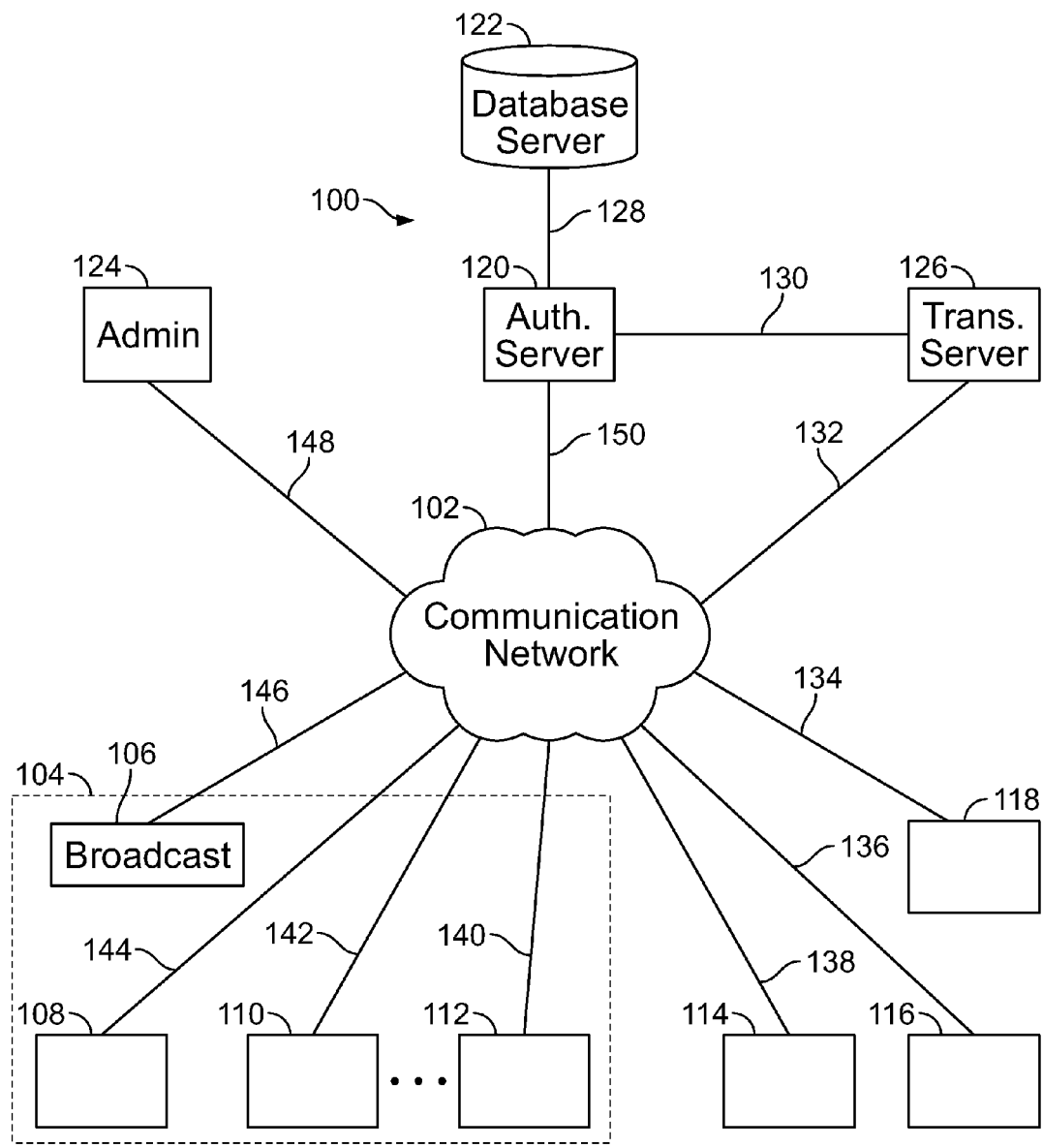
FIG. 1 is a block diagram of the Transcription Engine of the present invention coupled to clients and end users via a communication network.

The present invention provides a Transcription Engine that improves communications between a speaker broadcasting information in the form of voice communications and listeners of the actual or live broadcast or a recorded version of the broadcast. The device, system and method of the present invention comprises at least one server capable of transcribing, in real time, received voice communications into associated text and broadcasting the associated text to clients and end users of the Transcription Engine. The broadcast of the associated text helps to improve the understanding of the voice communications by those end users with hearing impairments or the end users having difficulty understanding the language in which the broadcast is done. The Transcription Engine broadcasts the associated text over a particular communication network in accordance with the protocols of the communication network. The Transcription Engine of the present invention registers and authenticates automatically clients desiring usage of the Transcription Engine to broadcast information to select groups and to end users who are members of the select groups.

The description of the system, device and method of the Transcription engine of the present invention is disclosed herein using the following terms, terminology, definitions and abbreviations:

The associated text refers to readable text resulting from a voice recognition system (including speech tuning algorithms) that analyzes and processes the voice communications received from a broadcaster. The broadcaster may be the actual person speaking or may be a voice agent located at the place of the broadcast who is repeating the words being spoken by the broadcaster to allow the Transcription engine to transcribe the words spoken by the voice agent when voice recognition software and speech tuning algorithms are able to transcribe automatically the words spoken by the voice agent based on spoken samples and other training mechanisms used to enable the Transcription Engine to correctly transcribe words spoken by the voice agent. The voice agent and the actual broadcaster may be the same person wherein the speaker prior to broadcasting has engaged the software in a training session enabling the voice recognition software to correctly transcribe words and sentences spoken by the actual broadcaster. The voice communications may be processed by the Transcription Engine of the present invention to generate the associated text while in its native analog form or processed after having been converted to digital form.

The term "automatic" or "automatically" refers to a process of steps and/or acts performed by the Transcription or other electronic, electrical or electromechanical device or machine in response to information inputted into the Transcription Engine at the time of input or at a later time.

The communication network is any digital or analog network or any combination of such networks whereby transmission and reception of associated text can be achieved.

An owner/controlling entity of the Transcription Engine is able to completely operate or control the operation of the Transcription Engine in any appropriate manner as deemed warranted by such entity or agent. A legal entity such as a person or a corporation or any defined entity can own the Transcription Engine.

The registration of a client or end user refers to a procedure designed by administrative personnel of the client (or of the owner/controlling entity) through the use of administrative equipment that may or may not be part of the Transcription engine to obtain profile information and other relevant information from a client or end user.

Administrative personnel can be individuals or groups of individuals assigned by the owner/controlling entity to design structures and a framework into which users of the Transcription engine input information. Administrative personnel also decide who gets access to the Transcription engine and how access to the Transcription engine is effectuated. Further, the Administrative personnel may create various rules (consistent with any and all agreements between clients and the owner/controlling entity) dictating capabilities and level of access to be afforded to end users or clients having access to the Transcription engine. Administrative personnel can also be agents of the client, but would still abide by rules and regulations outlined and generated by the owner/controlling entity of the Transcription Engine.

The profile information is identification information and relevant personal information of the client or end user. The inputting of information is mostly implemented with GUI interfaces that are used to prompt the registering client or end user to input particular information.

The authentication of a client or end user is the act precedent to giving a client or end user access to the Transcription Engine based on at least some of the profile information included in the registration process of the client or end user. Unique information of the client or end user will allow the Transcription Engine to provide access to said client or end user and provide agreed upon services to the client or end user.

Structures and a framework are data structures and data gathering techniques generated by administrative personnel and arranged with respect to each other so as to be consistent with a general approach (i.e., a framework) for obtaining, processing and managing information inputted into the Transcription engine by a client or end user.

A Server is a computer or computer system comprising of one or more processors, various blocks of memory, and supporting circuitry to process information and to interface with users or other servers.

An Authenticating Server is a computer or computer system that uses information inputted by an end user or client and information about an end user stored in a data base to determine whether to give such end user access to the Transcription Engine.

A Database Server is a computer or computer system in which information about end users and client whether inputted by the client or end user or obtained through other means, recorded broadcasts and other data associated with the Transcription Engine, are stored.

A Transcription Server comprises a computer or computer system and communications equipment and software capable of receiving voice communications and converting said received voice communications into associated text. The server is further able to broadcast the associated text over a communication network in accordance with the protocol(s) of the communication network. Further, the server is able to receive text messages and broadcast text messages.

Referring to FIG. 1, there is shown one embodiment of the Transcription Engine device and system 100 of the present invention. The particular embodiment of the Transcription Engine 100 shown in FIG. 1 comprises authenticating server 120 coupled to database server 122 and Transcription server 126 via communication links 128 and 130 respectively. Transcription server 126 is coupled to communication network 102 via communication link 132. Authenticating server 120 is coupled to communication network 102 via communication link 150. The term "couple(d) to" as used herein refers to a path or a series of connected paths (permanent or temporary) that allows information in one or more formats to flow from one point or equipment in a communication network to another point or equipment in the same or different network in accordance with the protocol(s) of the communication network.

Continuing with FIG. 1, the communication links (150, 128, 130 and 132) that couple the various components of the Transcription Engine to each other and to communication network 102 as shown in FIG. 1 can be physical communication links such are wire line links (e.g., copper lines, optical fibers, waveguides, coaxial lines, hybrid fiber coaxial lines), or wireless communication channels, which can be analog and/or digital channels implemented using circuit switching and/or packet switching techniques to convey information from one point to another point within a communication network or between different communication networks. Further, these links (150, 128, 130 and 132) may actually be part of communication network 102 or another network or part of two or more different networks; they are shown as separate distinct links for ease of display and description. The communication network(s) may use one or more of several various schemes for servicing multiple users simultaneously. For example, digital communication networks, such as packet switched communication networks use multiple access schemes such as Code Division Multiple Access (CDMA), Frequency Division Multiple Access (FDMA), Time Division Multiple Access (TDMA), Internet and OFDMA (Orthogonal Frequency Division Multiple Access). Also, all or part of communication network 102 may use circuit switching to convey information from one point/equipment to another point/equipment within one or more communication networks.

Transcription Engine 100 may comprise one server; that is, servers 120, 122 and 126 may actually represent parts of one server. However, regardless of the constitution of Transcription Engine 100, it contains proper communication equipment (such as receivers, transmitters, digital signal processors and other processing equipment) to interface with communication network 102 in accordance with one or more protocols of the network. Transcription Engine 100 can be owned and/or controlled by a single entity (i.e., an owner/controlling entity) that provides services to various types of clients who wish to use Transcription Engine 100 to, in turn, provide services to end users. The services to be provided to end users by a client are described in detail and are made available publicly to any entity or individual having access to communication network 102. Each client is provided with equipment having specialized access to the Transcription Engine. The equipment having specialized access to Transcription Engine 100 may be owned by the same entity that owns Transcription 100. Alternatively, a client of the owner/controlling entity may own such equipment. In either case, the client has control of specialized equipment, which it uses to obtain end users. Presumably each end user is aware of and understands the types of services being offered by the client and enters into an agreement (commercial or otherwise) with the client for a defined period of time. In the case of a commercial agreement, in exchange for the services being provided by a client, the end user would agree to pay a fee to the client. The specialized equipment is typically operated by administrative personnel of the client and will hereinafter be referred to as Administrative equipment.

The Administrative equipment may be part of the Transcription Engine 100 or may be part of equipment owned and controlled by a client who has been given special access to the Transcription Engine. The term "special access" refers to the ability of a client to administer and operate its organization (e.g., commercial, non-profit organization) within a framework and structure designed by the client or its administrative personnel in cooperation with the owner/controlling entity of the Transcription Engine. The framework and structure are to be compliant with rules and regulations set by the owner/controlling entity of the Transcription Engine. The particular client and its type of services will determine the framework and structure designed and built in compliance with the rules of the owner/controlling entity.

For example, the client may be a University that provides voice Transcription Engine services to its end users (e.g., students and/or faculty members) via communication network 102; in this case, the end users are the students of the University who may have language barriers or may have some difficulty hearing a lecturer (e.g., a professor) and have registered for a broadcast of a lecture of a course that they are taking. The broadcast may be the associated text of the voice communications transcribed by the Transcription Engine. Any student who is taking the course and who has registered for the live text service may attend the lecture in the classroom in which the lecture is taking place or in a geographical location remote from the classroom. The University, through its Administrative personnel and equipment, may have a list of courses for which it is providing live text service. Any student taking a course included in the list is able to register for live text broadcasting and may receive such live broadcasting while attending class either in the lecture room or at any location remote from the lecture room as long as the student has an appropriate communication device for receiving the broadcast and access to Transcription Engine 100 via communication network 102.

Another example of a client is a particular church whose members can be part of a congregation at the church or remote from the church for regular church services and/or special church services. In this example, the end users are church members who have registered for a live text broadcast and thus are attending services at the church or remotely from the church and are able to receive the broadcast of the associated text using an appropriate communication device having access to Transcription Engine 100 via communication network 102. Individuals wishing to become members of the church can do so by providing profile information (e.g., required personal information) to an employee of the church who is an administrator and thus can enter profile information of a person wishing to become a church member into Transcription Engine 100 via Administrative equipment 124 and communication network 102. One feature of this embodiment is that the end user need not be an authenticated user to receive the transcribed text from a live church service. The Administrator, for example, is given the option to allow access to the transcribed text to authenticated or unauthenticated end users or both types of end users.

Yet another example of a client is a professional organization, which periodically holds a convention or meetings for its members at various locations. During the convention, there may be multiple simultaneous broadcasts by various departments of the professional organization for its attending members including members with language barriers and/or hearing impairment. For example, many members of an international scientific organization may not be fluent in the language being used in the convention and its various meetings. Also, some members may suffer, to a certain extent, from a hearing impairment. Such members may still attend the convention, but simultaneously view the broadcast of associated text of a meeting that they are currently attending with the use of an appropriate communication device having access to Transcription Engine 100 via communication network 102. As with the other two examples discussed above, other end users not physically located at the convention site of the professional organization may also view the various available broadcasts with appropriate communication devices having access to Transcription Engine 100 via communication network 102. Members obtain access by registering through administrative personnel of the professional organization.

All of the examples discussed above are now described in more detail with the use of FIG. 1. Accordingly, still referring to FIG. 1, Administrative equipment 124 is coupled to Transcription Engine 100 via communication link 148 and communication network 102. The client may be broadcasting information from location 104 with client equipment 106 to end user equipment 108, 110 and 112 also at physical location 104 and to end user equipment 114, 116 and 118 located at respective geographical locations remote from location 104. Client equipment 106, end user equipment 108, 110, 112, 114 and 116 are coupled to communication network 102 via communication links 146, 144, 142, 140, 138, 136 and 134 respectively. A broadcaster, who may be an employee of the client, operates equipment 106. End users operate the remaining equipment at location 104 and equipment 114, 116 and 118 at the various remote locations. An Administrative personnel of the client operates Administrative equipment 124.

The examples will be discussed in the context where communication network 102 is the Internet, and the equipment being used by the end users and the broadcaster are Internet enabled devices such as laptops, cellular phones (e.g., smart phones), tablets, desktop computers and other communication devices capable of gaining access to the Internet through the use of Internet browsers such as Explorer, Safari, Firefox, Windows Mobile, Netscape Navigator, Lynx, Symbian, and receive information not only in their original formats, but also in Java, Flash, HTTP/S, TEXT and XML formats which are typically used by the Internet and Internet enabled devices and/or packet networks. The communication links coupling the end user equipment (i.e., Internet enabled devices) to the Internet and ultimately to Transcription Engine 100 include connections to the particular ISP's (Internet Service Provider) to which the broadcaster and the end users subscribe.

For the example where the client is a University, the broadcaster equipment 106, i.e., a laptop, is being operated by a lecturer (e.g., a professor) of a class located at location 104 in the University and the class is being attended by students some of which have internet enabled devices registered as end users of the Transcription Engine 100. The lecturer of the class has registered his laptop 106 with Transcription Engine 100 of the present invention in a manner to be described supra. Equipment 106 can be a laptop with Blue Tooth capabilities. The lecturer, as he is lecturing, may be using a headset/microphone device (not shown) that is wirelessly coupled to laptop 106 allowing his voice to be transmitted to laptop 106 which in turn transmits the lecturer's voice signal via communication link 146, the Internet, and communication link 132 to Transcription server 126 of Transcription Engine 100; this is assuming the Lecturer has participated in one or more training sessions that enable Transcription Engine 100 to properly and correctly transcribe words and sentences spoken by the Lecturer. Alternatively, a voice agent, whose voice is recognizable to Transcription Engine 100 due to training sessions, may be placed at the location of the broadcast to repeat the words spoken by the Lecturer. The words from the voice agent are then transmitted to Transcription Engine 100 for conversion into associated text, which are ultimately broadcast to students viewing the live text broadcast. Transcription server 126 of Transcription Engine 100 uses voice recognition software and speech tuning algorithms to convert the received voice signals into the associated text. Transcription server 126 broadcasts the associated text to the various students attending class either at the classroom (i.e., location 104) or at other locations. The client (i.e., the University or lecturer) may also receive the broadcast voice and associated text through an Internet enabled device. Thus as shown in FIG. 1, laptops 108, 110 and 112 being operated by students inside the class are receiving the voice and text signals from Transcription Engine 100 via their respective communication links. Similarly, students remotely located from classroom 104 and operating laptop 114, tablet 116 and smartphone 118 are also receiving the broadcast. It will be readily understood that Transcription Engine 100 is capable of simultaneously broadcasting multiple lectures for the same client or different clients. To maintain the quality of the voice signal in each separate broadcast, Transcription Engine 100—in establishing communications between it and each broadcaster—assigns a communication channel exclusive to each broadcaster to remove the possibility of interference between voice signals of different broadcasters. Additionally, immediately before the commencement of a broadcast, the Transcription performs a series of signal of test procedures to adjust signal quality of signals received at remote locations of the broadcast. For example, the broadcaster will be given a time window within which the broadcaster can adjust his/her microphone level and adjust other components and operational parameters of the equipment he/she is using to effectuate signals (being received or transmitted by the Transcription engine) having relatively high quality in the broadcast.

As described above, Transcription Engine 100 broadcasts the associated text of the lecturer's voice or a voice agent repeating the words and phrases spoken by the lecturer. Voice signals are transmitted over the Internet as packets of information. Each packet represents a portion of the voice signal. Further, different packets may take totally different paths from each other as they traverse the Internet. All of the packets of a voice signal once received by the Transcription Engine are then reconstituted and converted back to a voice signal, which the Transcription Engine 100 transcribes into associated text. The Transcription Engine 100 then broadcasts the associated text over the Internet in packet form. As is well known, the Internet is a worldwide communication network accessible from virtually anywhere in the world. Depending on the route taken by the initial voice packets and the route taken by the resulting associated packets, a certain amount of noticeable delay may have occurred from the time the lecturer's voice is transmitted over the Internet to Transcription Engine 100 to the time the associated text are finally received by a student in the classroom.

A student present in the class at location 104 who is receiving the broadcast with his/her laptop may notice this delay. To significantly lessen a student in the class from noticing this delay, once a communication channel is established between the lecturer and Transcription Engine 100 and prior to the start of the broadcast, Transcription Engine 100 downloads the necessary software for broadcasting onto the lecturer's laptop 106. In particular, Transcription Engine 100 downloads onto the lecturer's laptop voice recognition software and the speech tuning algorithms needed to convert the voice into text and also the software needed to broadcast via the Internet (or other communication network) the associated text to students registered for the broadcast. During registration of the lecturer, the administrator would have confirmed that the particular device (e.g., laptop, desktop, server) to be used by the lecturer is able to handle and process the software needed to perform the broadcasting in much the same manner as the Transcription engine. The lecturer's laptop 106 in effect becomes broadcasting equipment operating in much the same manner as Transcription Engine 100, but with the proper support from the Transcription Engine 100 whereby it relies on the Transcription Engine 100 to download the necessary software when needed. In particular, laptop 106 broadcasts the associated text information over the Internet to all registered students; this includes students operating laptops 108, 110 and 112 in the classroom and students operating laptop 114, tablet 116 and smart phone 118 who are remotely located from classroom 104. As a result, a student present in classroom 104 and who is registered for the broadcast will notice very little, if any, delay between the lecturer's voice and the associated text signal being received by his laptop.

To make the operation of the Transcription Engine of the present invention feel and appear more like a virtual classroom, students remotely receiving the broadcast of the associated text (or students receiving the broadcast but located in the classroom) can have the ability to ask questions during the lecture. Certain students may be given the ability to ask questions during the broadcast based on the level of accessibility provided to these students during the registration process. The Administrator of the Transcription Engine can configure or devise various implementations of this feature. For example, during the registration process, the Transcription can give the student the option to pay an extra fee for this ability. In another example, the Transcription Engine may allow any student (remotely located or in the classroom) to ask for permission to ask a question, and based on the circumstances of the broadcast the student may be allowed to ask the question; in this example, no prior agreement on a fee for such a student capability need to have been entered upon between the student and the University during registration.

A student having the ability to ask questions during the broadcast will be instructed how to do so using special keys (e.g., control keys, function keys on the keyboard, or a special sequence of specific keys), which the Transcription engine will recognize as a request to ask questions. In response, the Transcription Engine will confirm with the student that, indeed, the student wishes to ask a question as the student could have inadvertently type the requisite keys. Another implementation may be where the Transcription Engine provides a special request link (or graphics object) on the screen and instructs the student to click on said link or object when the student wishes to ask a question. Upon confirmation by the Transcription Engine that a student desires to ask a question, the Transcription Engine will prompt the student with a small window into which the student can type the question followed by an end of question symbol (defined by the Transcription Engine). The Transcription Engine will signal to the lecturer or to a monitoring Administrator in a relatively unobtrusive manner that there is an outstanding question. The Administrator can first review the typed question to check for its relevance and appropriateness. The question can be 'accepted' by the Administrator or Lecturer and, in such a case, the student asking the question is informed through his/her device. Conversely, a question may be 'denied' by the Administrator and/or Lecturer and the student will be so informed also; the student may or may not be told why the question was denied depending on the particular class and/or subject manner being discussed and the relevancy of the question to the subject matter. Once the question is accepted, the broadcaster, at his/her chosen time, broadcasts the question to everyone and proceeds to answer the question. Each accepted question may appear as a graphic object on the Lecturer's screen. The Lecturer may simply click on the object associated with a question and the text typed by the student is broadcast. To avoid a Lecture fragmented by too many questions, the Transcript Engine may not allow questions for a defined time period after a previous question was answered. Further, the Transcription may allocate a certain number of questions (during a broadcast) to each eligible student.

A student in the classroom who wants to ask a question in a normal manner (not using the Transcription of the present invention) may do so upon being granted permission by the Lecturer. The student's question can then be voiced by a voicing agent in the classroom or can be repeated by the Lecturer (in the case where the Lecturer's voice is recognizable by the Transcription engine) resulting in a broadcast of the question in associated text. The Lecturer can then proceed to answer the question appropriately.

Figure 2:
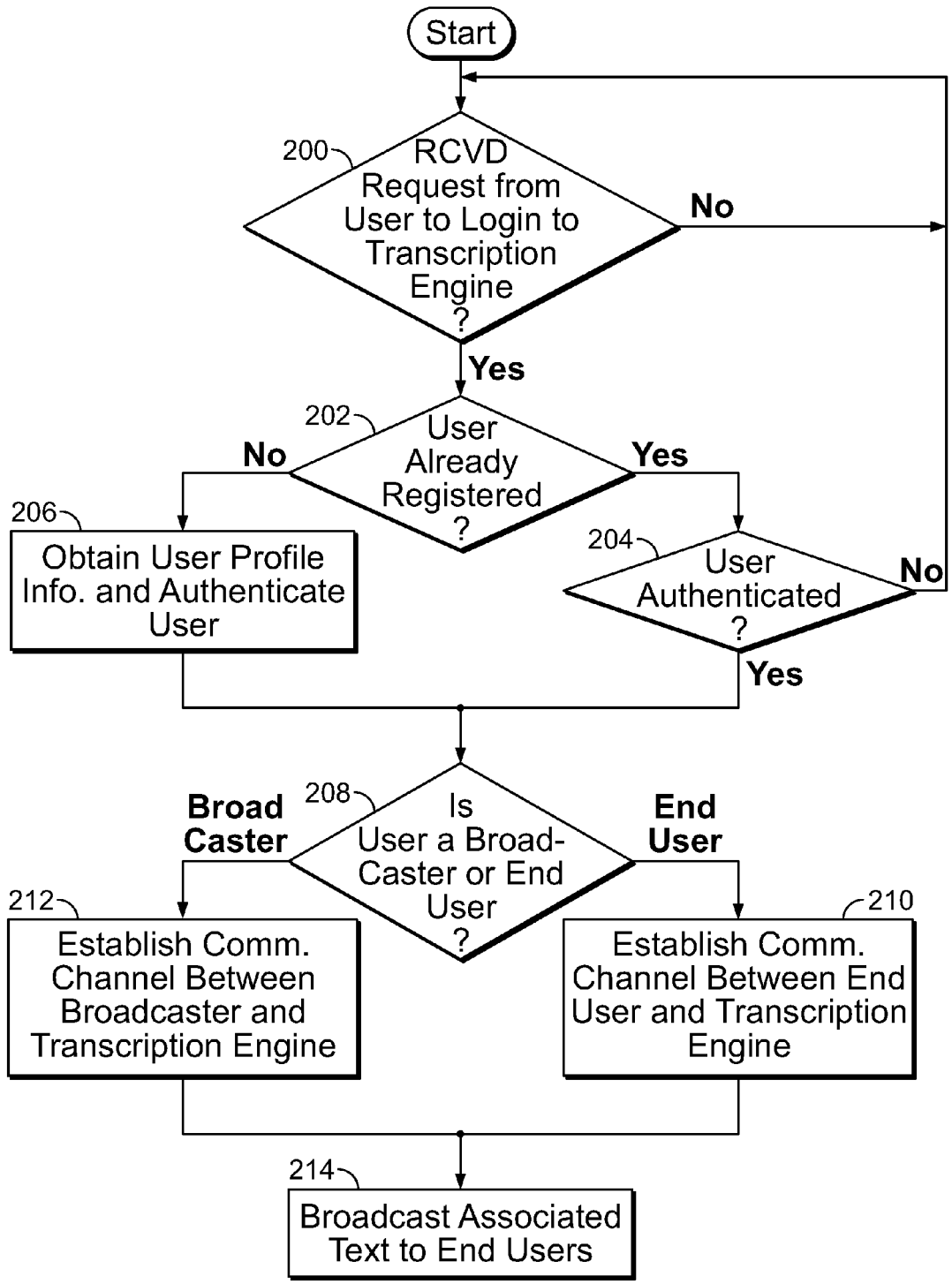
FIG. 2 is a flow chart illustrating the method of the present invention.

Referring now to FIG. 2, there is shown a flowchart of the steps of the method of the present invention. In step 200, the Transcription Engine determines whether it has received a request from a user to login to Transcription Engine 100. Continuing with the example of a Lecturer at a University broadcasting his/her lecture over the Internet to students who have registered for the live text broadcast, the Lecturer and students are presumed to have access to the Internet and thus to the URL (Uniform Resource Locator) of the Transcription Engine of the present invention. Prior to step 200, an Administrator (i.e., Administrative personnel) for the University working with the owner/controlling entity of the Transcription Engine will have set up the structures and framework to list courses, their lecturers and students capable of participating in the University's live text broadcast of lectures over the Internet. The Administrator gains access to the Transcription Engine via the Internet using equipment 124 (e.g., a desktop, a server, a laptop) as shown FIG. 1. The Administrator is able to login to the Transcription Engine and is able to provide different levels of access to lecturers and students as warranted. The Administrator is able to design various screens with graphics, pull down menus, Tool bars and other GUI (Graphic User Interface) techniques that facilitate the design of a framework and structures for the particular user being represented by the Administrator. The Administrator has overall responsibility and authority to manage broadcasters and end users with various levels of access. An Administrator, for example, has the authority to add, delete, approve and manage end users and broadcasters at various levels. Administrators have authority over who has access to their system and as such may adjust or amend the list of broadcaster and end users as circumstances warrant.

Upon visiting the website associated with the Transcription Engine of the present invention, the user is presented with the various lists of the services provided by the Transcription Engine; this can be done in a pull down menu or a link (not shown). In this case the user will have selected University Lectures as one of the services provided by the owner/controlling entity of the Transcription Engine. Upon making his/her selection from a pull down menu that includes Church Services, Professional Organizations and other clients, the user is given the opportunity to register as a new user or login if the user has already registered. A login screen allows the user to login either as a broadcaster or as a student. As a broadcaster, the user may be a lecturer of a University already registered with LectureCaptions or the User may be a representative of a University intending to become a new client of LectureCaptions. In this case, the client is a University, which has registered or is about to register with a company called LectureCaptions. Presumably, LectureCaptions is part of the owner/controlling entity of the Transcription Engine that is able to offer various live text broadcasts to different types of organizations such as Universities, Churches and Professional Organizations.

In step 202 of the method of the present invention, the Transcription Engine determines whether the user is already registered. The Transcription confirms user registration by confirming the user's login and password information and other information available to the Transcription Engine. For example, in response to the entry of information inputted by user in the request, the Transcription Engine may ask the user several questions in an attempt to verify that the user, has indeed, already registered with the Transcription Engine. If the user has already registered, the method of the present invention moves to step 204 where the Transcription Engine endeavors to authenticate the user. If the user is authenticated, the method of the present invention moves to step 208. If, however, the user cannot be authenticated for whatever reason, the Transcription Engine does not give the user access to its services, but allows the user to re-register at steps 200, 202 and 206 and then to login again. Authentication of the user relates to unique information about the user inputted by the user during initial registration. The user is also given the opportunity to amend such unique information at any point during his/her membership to the Transcription Engine.

Figure 3:
FIG. 3 is a screenshot showing a login window for a lecturer of a University.
Figure 4:
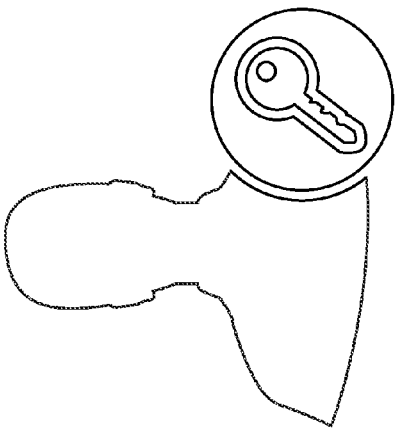
FIG. 4 is a screenshot showing a login window for a student of a University.
Figure 5:
FIG. 5 is a screenshot showing a login window for a School or University.

In step 206, the Transcription Engine generates queries and obtains information to uniquely identify the user and thus generate user profile information. The user profile information is stored in database server 122 (see FIG. 1). The Transcription Engine 100, and in particular, Authentication server 120 (see FIG. 1) uses part of the user profile information to authenticate the user in future login attempts by the user. Also, in step 206, the user enters into an agreement with LectureCaptions to determine the user's level of membership, payment mechanism, and billing arrangement. Such standard user information as email address, street address, membership type (lecturer or student) form part of the information used to generate user profile information. Also, it is during the registration process that the user selects a password and other unique information that allows the Authenticating server 120 of the Transcription Engine 100 to authenticate the user after proper login. Authenticating Server 120 uses at least part of the user profile information stored in database server 122 to authenticate a user. After the user has been properly registered, the user is given an opportunity to login; for a lecturer, the user is prompted with the screenshot shown in FIG. 3. For a student, the user is prompted with the screenshot shown in FIG. 4. For a University, the user is prompted with the screenshot shown in FIG. 5. These screenshots represent one example of a particular GUI approach that allows end users to gain access to the Transcription Engine of the present invention. Upon gaining access to the website of the Transcription Engine, an end user is allowed to log in the manner shown by FIGS. 3-5. It will be readily understood that the appearance and design of the screenshots shown in FIGS. 3-5 are exemplary and that other screenshots of different configuration can certainly be contemplated. A University, or its representative, when registering for the first time may be considered a broadcaster. Also, a lecturer of the University registering its class for broadcasting is also considered a broadcaster. For a lecturer registering for the first time or amending registration information, step 206 is followed by step 208. Also, a student registering for the first time would be allowed to either move to step 208 or requested to re-login using the information he/she has just inputted into the Transcription Engine.

In step 208, the method of the present invention determines whether the user is a broadcaster (University and/or lecturer of a University) or an end user (i.e., a student at the University). If it is determined that the user is a broadcaster, the method of the present invention moves to step 212 and establishes a communication channel between the broadcaster equipment and the Transcription Engine. The Transcription Engine at this point already has available the profile information of the broadcaster from the registration step described above. The Transcription Engine is to establish and confirm communications between it and the broadcaster equipment in accordance with Internet protocols that dictate the transmission of text streamed over the Internet. The Transcription Engine affords the broadcaster all of the privileges and capabilities agreed upon between the broadcaster and the owner/controlling entity of the Transcription Engine during registration. If at step 208, the Transcription Engine had determined that the user is an end user (e.g., a student), the method of the present invention moves to step 210 where the Transcription Engine similarly establishes a communications channel for the end user so that the end user, if logged in during the broadcast, is able to receive the associated text from the broadcast. The method of the present invention then moves to step 214 where Transcription Engine receives streaming voice, from a broadcaster and converts said voice to associated text and broadcasts the associated text to all registered and authenticated end users and clients who are logged in during the broadcast. The broadcast of the associated text may be done in accordance with instructions provided during the broadcast by the Administrator associated with the client. Such instructions comprise allowing certain end uses to ask questions via text during the broadcast. Other instructions may relate to removing end users who are improperly interrupting the Lecturer during the broadcast. Yet other sets of instructions may relate to advising the lecturer (or voice agent) to adjust his/her microphone to improve the quality of the voice signals being received by the Transcription Engine. These instructions can be sent by the Administrative equipment (presumably under the control of an administrative personnel) as a text in much the same manner certain end users can send text to the Lecturer during the broadcast to ask questions. The Transcription engine records the live text broadcast and stores it either in the data base server 122 or other accessible memory space under the control of and accessible to the Transcription Engine. The Transcription Engine, while under the operation of an Administrator, can then review, amend and otherwise make clarifying adjustments to the recorded broadcast for re-broadcast at a later time.

While various aspects of the present invention have been described above, it should be understood that they have been presented by way of example and not limitation. It will be apparent to persons skilled in the relevant art(s) that various changes in form and detail can be made therein without departing from the spirit and scope of the present invention. Thus, the present invention should not be limited by any of the above described exemplary aspects, but should be defined only in accordance with the following claims and their equivalents.

In addition, it should be understood that the figures in the attachments, which highlight the structure, methodology, functionality and advantages of the present invention, are presented for example purposes only. The present invention is sufficiently flexible and configurable, such that it may be implemented in ways other than that shown in the accompanying figures.

What is claimed is:

1. A Transcription Engine comprising:
   at least one server configured to automatically register and authenticate an end user or broadcaster based on received end user equipment information and received broadcaster equipment information respectively and perform a broadcast by transcribing, in real time, voice communications received from registered broadcaster equipment, into associated text and broadcast the associated text to the registered end user equipment or to the registered broadcaster equipment; and administrative equipment coupled to the at least one server, the administrative equipment operated to accept a request from a registered end user equipment to ask questions during the broadcast and to confirm the broadcast of the questions or deny the request.

2. The Transcription Engine of claim 1 where the at least one server is configured to provide Transcription Engine services simultaneously to one or more broadcaster equipment.

3. The Transcription Engine of claim 1 where the at least one server uses voice recognition software to transcribe the voice communications into associated text.

4. The Transcription Engine of claim 1 where the at least one server is configured to receive instructions from the administrative equipment where such instructions dictate capabilities and levels of access to be afforded to end user equipment or broadcaster equipment.

5. The Transcription Engine of claim 1 where the at least one server is configured to receive instructions from the administrative equipment to adjust the voice communications being received by the Transcription Engine from the broadcaster equipment.

6. The Transcription Engine of claim 1 where the at least one server comprises an authentication server coupled to a database server and a transcription server where said database server contains profile information associated with the broadcaster equipment and end user equipment, said authentication server uses at least some of the profile information to authenticate end user equipment information or broadcaster equipment information and said transcription server performs the transcribing of voice communications into associated text and the broadcasting of the associated text to the broadcaster equipment and end user equipment in accordance with instructions received from an administrative equipment coupled to the Transcription Engine.

7. The Transcription Engine of claim 1 where during the broadcast certain end user equipment are allowed to transmit a certain number of text messages to the broadcaster equipment for broadcast at a later time during the broadcast.

8. The Transcription Engine of claim 7 where the administrative equipment is operated to to review the text message received from end user equipment and determine whether to broadcast the received text.

9. The Transcription Engine of claim 1 where the broadcast is recorded to allow for editing of the associated text prior to a re-broadcast.

10. The Transcription Engine of claim 1 where the associated text is broadcast over the Internet in accordance with the Internet Protocol (IP).

11. The Transcription Engine of claim 10 where the at least one server operates as a web server with a particular URL (Uniform Resource Locator) at which a broadcaster equipment or an end user equipment registers and login and after having been authenticated by the at least one server, the broadcaster equipment broadcasts the associated text to allow the end user equipment to receive the associated text during a live or recorded broadcast.

12. The Transcription Engine of claim 10 where an end user equipment is authenticated based on at least a portion of user profile information received during registration.

13. The Transcription Engine of claim 10 where after an end user equipment has been authenticated, the at least one server establishes a communication channel to the end user equipment to allow said end user equipment to receive associated text of a scheduled broadcast.

14. The Transcription Engine of claim 1 further comprising administrative equipment coupled to the Transcription engine via a communication link and a communication network.

15. A method of broadcasting information by a Transcription Engine comprising:

registering and authenticating automatically, by at least one server of the Transcription Engine, a broadcaster or an end user based on broadcaster equipment information or end user equipment information received by the at least one server;

transcribing, in real time by the at least one server, received voice communications from the registered broadcaster equipment into associated text and broadcasting, by the at least one server, the associated text over a communication network to the authenticated and registered end user equipment or registered and authenticated broadcaster equipment and accepting or denying, by the at least one server, a request from a registered end user equipment to ask questions during the broadcast and confirm the broadcasting of the questions.

16. The method of claim 15 where the step of registering comprises providing structures and a framework by the Transcription Engine to allow information from end user equipment and broadcaster equipment to be received into the Transcription engine during registration.

17. The method of claim 14 where the communication network is the Internet.

18. The method of claim 17 where a website associated with the Transcription Engine to enable reception of end user information and broadcaster information to register or to login to the website.

19. The method of claim 15 where accepting or denying a request to ask questions during the broadcast is based on instructions received from administrative equipment coupled to the at least one server.

20. The method of claim 15 where transcribing received voice communications into associated text and broadcasting the associated text comprises downloading broadcasting software, voice recognition software and speech tuning algorithms onto a broadcaster equipment to allow the broadcaster equipment to broadcast the associated text.

* * * * *